(12) United States Patent
Schumski (10) Patent No.: US 11,097,989 B2
(45) Date of Patent: Aug. 24, 2021

(54) COMBINED FERTILIZER AND HUMICS SOLUBLE GRANULES

(71) Applicant: THE ANDERSONS INC., Maumee, OH (US)

(72) Inventor: Joseph Schumski, Maumee, OH (US)

(73) Assignee: The Andersons Inc., Maumee, OH (US)

( * ) Notice: Subject to any disclaimer, the term of this patent is extended or adjusted under 35 U.S.C. 154(b) by 75 days.

(21) Appl. No.: 15/856,476

(22) Filed: Dec. 28, 2017

(65) Prior Publication Data

US 2018/0222810 A1   Aug. 9, 2018

Related U.S. Application Data

(60) Provisional application No. 62/456,035, filed on Feb. 7, 2017.

(51) Int. Cl.
| | |
|---|---|
| *C05F 11/02* | (2006.01) |
| *C05C 9/00* | (2006.01) |
| *C05G 3/40* | (2020.01) |
| *C05G 5/30* | (2020.01) |

(52) U.S. Cl.
CPC .............. *C05C 9/005* (2013.01); *C05F 11/02* (2013.01); *C05G 3/44* (2020.02); *C05G 5/30* (2020.02)

(58) Field of Classification Search
CPC ..... C05F 11/02; C05G 3/0041; C05G 3/0082; C05G 3/44; C05G 5/30; C05C 9/005
See application file for complete search history.

(56) References Cited

U.S. PATENT DOCUMENTS

2016/0229763 A1*  8/2016  Wheeler .............. C05G 3/0041

FOREIGN PATENT DOCUMENTS

| AU | 2003238563 B2 * | 1/2004 |
| BR | PI1101567 A2 * | 6/2013 |
| CN | 104058898 A * | 9/2014 |
| CN | 106278693 A * | 1/2017 |

OTHER PUBLICATIONS

Watson, C. J., and D. J. Kilpatrick. "The effect of urea pellet size and rate of application on ammonia volatilization and soil nitrogen dynamics." Fertilizer research 28.2 (1991): 163-172.*

(Continued)

*Primary Examiner* — Jennifer A Smith
(74) *Attorney, Agent, or Firm* — Blue Filament Law PLLC (57) ABSTRACT

A combined fertilizer and humics soluble granule is provided that includes at least soluble fertilizer particles admixed with a plurality of humic particles without a binder. A combined fertilizer and humics soluble granule is also provided that includes at least one soluble fertilizer-rich domain fused to at least one humic-rich domain. A process of forming a combined fertilizer and humics soluble granule is provided that includes forming a mixture of particles of soluble fertilizer and humics, the particles of urea each having a urea particle surface. The soluble fertilizer particle surface is tackified in contact with the particles of humics to create adherence between the soluble fertilizer particle surface and the particle of humics to form a granule without resort to a binder.

18 Claims, 4 Drawing Sheets

(56) References Cited

OTHER PUBLICATIONS

Ecocatalysts, Black Urea 46-0-0-0 <www.ecocatalysts.com.au/agriculture/agriculture-products/black-fertilisers/black-urea/> pp. 1-4. Apr. 25, 2018.*

Black Urea Product Brochure, Distributed by EcoCatalysts Pty Ltd. 2017.*

Pharma Guideline. "Powder Fineness (Types of Powder)" <https://web.archive.org/web/20130205070332/https://www.pharmaguideline.com/2011/05/powder-fineness.html> Feb. 5, 2013 (Year: 2013).*

International Raw Materials, Ltd (IRM) "Ammonium Sulphate, Granular Grade Product Specification Sheet". Dec. 10, 2012 (Year: 2012).*

Pettit, Robert E., "Organic Matter, Humus, Humate, Humic Acid, Fulvic Acid and Humin: Their Importance in Soil Fertility and Plant Health", Dr. Robert E. Pettit, Emeritus Associate Professor Texas A&M University (2004).

Rosliza, S. et al., "Controlling Ammonia Volatilization by Mixing Urea with Humic Acid, Fulvic Acid, Triple Superphosphate and Muriate of Potash", American Journal of Environmental Sciences, May 2009, pp. 605-609, vol. 5, Issue 5, © 2009 Science Publications; DOI: 10.3844/ajessp.2009.605.609.

* cited by examiner

COMBINED FERTILIZER AND HUMICS SOLUBLE GRANULES

RELATED APPLICATIONS

This application is a non-provisional application that claims priority benefit of U.S. Provisional Application Ser. No. 62/456,035 filed 7 Feb. 2017; the contents of which are hereby incorporated by reference.

FIELD OF THE INVENTION

The present invention relates in general to a fertilizer and in particular to particulate fertilizer combined with humate to afford granules that have a highly uniform consistency and coating with limited dusting.

BACKGROUND OF THE INVENTION

Fertilizer is any organic or inorganic material of natural or synthetic origin that is added to a soil to supply one or more plant nutrients essential to the growth of cultivated vegetation. Fertilizers typically provide, in varying proportions: six macronutrients: nitrogen (N), phosphorus (P), potassium (K), calcium (Ca), magnesium (Mg), and sulfur (S); and eight micronutrients: boron (B), chlorine (Cl), copper (Cu), iron (Fe), manganese (Mn), molybdenum (Mo), zinc (Zn) and nickel (Ni). Only three other macronutrients are required by all plants: carbon, hydrogen, and oxygen, which are supplied by water (through rainfall or irrigation) and carbon dioxide in the atmosphere. Compound fertilizers often combine N, P and K fertilizers into easily dissolved pellets. The N:P:K ratios quoted on fertilizers give the weight percent of the fertilizer in nitrogen (N), phosphate ($P_2O_5$) and potash ($K_2O$ equivalent).

Fertilizer application to large areas of cultivated vegetation such as golf courses, parks, lawns, gardens and woodlands has generally been broadcast application of granular products containing an agent, for example via rotary spreader. Granular materials have the advantage of not being susceptible to drift or the field solvation associated with liquid fertilizers. Agents that can be deployed in a granular form include plant nutrients, fertilizer, and pesticides. Using granular products having particle sizes in the range of about 0.5 millimeter to about 15 millimeters, an operator can cover a large area with minimal distance traversed by the spreader itself, while applying the granular products relatively uniformly to the desired area. While efforts have been made to use crystallized urea particles alone, urea particles are both hygroscopic and are prone to breakage with dusting occurring thereafter.

Besides N-P-K values, there is a growing appreciation that fulvic and humic acids provide a rich carbon source for maintaining and improving soil biology. Fulvic and humic acids have numerous proven benefits for soil and plant health which include: enhanced nutrient efficiency, micronutrient uptake, soil nutrient holding capacity, biological activity, and water holding capacity. Both fulvic and humic acids have unique physical and chemical properties that contribute to their effectiveness and the way they complement fertilizer programs. Fulvic acids are very soluble (>80 mg/L) and can be readily absorbed by leaves and roots, making them well suited for foliar application. Fulvic acids enhance the absorption of nutrients and aid in the efficiency of plant metabolic reactions. Humics in contrast, are less water soluble, have a pH dependence to the solubility, and have a high cation exchange capacity (CEC), which helps enhance the nutrient holding capacity of the soil after application. Humics chelate many essential nutrients and help stimulate soil microbiology. Unfortunately, fulvic acid and humic acid tend to be low specific gravity substances that are prone to dusting thereby making powdered delivery problematic. Dissolution of these acids for spray application also tend to clog spray applicators.

There are many types of controlled-release or enhanced efficiency nitrogen fertilizer products currently available that provide the single benefit of potentially improving the utilization of applied nitrogen. Some nitrogen products use physical coatings such as polymers and/or sulfur to slow the release of nitrogen, while enhanced efficiency nitrogen products use chemical additives to suppress beneficial soil biology. Unfortunately, these coatings can act as a physical barrier to slow nitrogen release or disrupt the soil biome.

While considerable attempts have been made to use crystallized urea particles alone, urea particles are both hygroscopic and are prone to breakage with dusting occurring thereafter.

Thus, there is a continuing need for mixed soluble fertilizer and humate granules that have a variety of handling profiles. There is a further continuing need to improve the ease of manufacturing over existing coating processes that produce humate coated fertilizer granules. There is still further a continuing need for binder substitutes that are economical and readily available. There also exists a continuing need for a dispersible fertilizer granule including such a binder substitute.

SUMMARY OF THE INVENTION

A combined fertilizer and humics soluble granule is provided that is defined by a shape and size and includes at least one soluble fertilizer particles and plurality of humic particles admixed with the plurality of soluble fertilizer particles without a binder.

A combined fertilizer and humics soluble granule is provided that is defined by a shape and size and includes at least one soluble fertilizer-rich domain and at least one humic-rich domain fused to the at least one soluble fertilizer-rich domain. The fertilizer-rich domain may be a urea core with a coating formed from the at least one humic-rich domain.

A process of forming a combined fertilizer and humics soluble granule is provided that includes forming a mixture of particles of soluble fertilizer and humics, the particles of urea each having a urea particle surface. The soluble fertilizer particle surface is tackified in contact with the particles of humics to create adherence between the soluble fertilizer particle surface and the particle of humics to form a granule without resort to a binder.

DETAILED DESCRIPTION OF THE INVENTION

The present invention relates to a novel form of a water-dispersible granule for delivery of soluble fertilizer to a plant, along with humics. The resulting granules are amenable to application both as free-flowing granules and with excess water as a spray applied solution to promote plant growth.

As used herein, the term "humics" refers to humic acid, fulvic acid, and salts thereof such as sodium, potassium, and calcium salts, and combinations thereof.

As used herein, the term "soluble fertilizer" refers to a substance including at least one type of N-P-K element present as an ion or a compound with a solubility in 100 milliliters of deionized water of at least 10 grams under conditions of standard temperature and pressure (STP). Soluble fertilizers operative herein illustratively include potassium sulfate (sulfate of potash), potassium nitrate (nitrate of potash), potassium metaphosphate, potassium chloride (muriate of potash), dipotassium carbonate, or potassium oxide, ammonium salts, such as metal ammonium phosphates, ammonium nitrate, ammonium sulfate, urea, coated urea, monoammonium phosphate, and diammonium phosphate; dicyandiamide, carbodiimides, crotilidiene diurea, nitrocellulose, calcium nitrate, or combinations thereof.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

Embodiments of the present invention combine a soluble fertilizer based fertilizer with a humic in general and in specific embodiments, with potassium humate as intermixed products formed by co-melting, co-mingling granules that require minimal water to stick together and tumble to form a granule, or as two hemispherical portions joined together. The intermixed products offer ease of manufacturing over existing coating processes that produce humate coated soluble fertilizer granules. In some inventive embodiments, a urea-soluble fertilizer has no binder present in the granule with adhesion being created either by melt cooling or the use of small amounts of water to create surface adhesion between separate domains during a pan agglomeration process.

In contrast to the prior art, fused humics whether present as a coating, mixture, or adjunct domain does not act as a physical barrier to slow nitrogen release, but instead operates synergistically with the soluble fertilizer to promote and enhance soil biology.

Humics contain beneficial fulvic and humic acids that provide a rich carbon source for maintaining and improving soil biology. Fulvic and humic acids have numerous proven benefits for soil and plant health which include: enhanced nutrient efficiency, micronutrient uptake, soil nutrient holding capacity, biological activity, and water holding capacity. As a result, an inventive granule affords improved handling properties, flexibility as to whether applied as a powder to spray to a target crop, all while improving soil quality.

Humics provide a carbon food source which stimulates soil microbiology. Microbes support soil and overall plant health by making nutrients available to plants in the inorganic form. Humics are a primary food source to grow populations of beneficial soil fungi, including mycorrhizal fungi.

The complex structure of humics enables many opportunities for interactions with nutrients. These interactions keep nutrients accessible to the growing plants and prevent leaching or tie up. Humics also increase the availability of micronutrients to the plant. Larger molecules of humics physically modify soil structure which increases soil aggregate stability, improves water infiltration, nutrient holding capacity, aeration, soil tilth, and workability.

The granules are multipurpose in that they are wholly soluble granules that can be solubilized for spray application or dry applied as a free-flowing powder through typical dry spreading equipment. As a result, inventive granules are well suited for use on large turf applications such as golf course tees, aprons, fairways and roughs, sports fields, commercial and residential lawns, ornamentals, and specialty crops.

In a specific inventive embodiment, a homogeneous granule is formed by mixing grains or powders of humate and soluble fertilizer together prior to formation of the granule. In a specific inventive embodiment powders of humic and urea are both wetted with water to form a slurry that is then formed into a homogenous mass that is ground to form granules, while in other embodiments, the slurry is pan agglomerated and dried to form inventive granules.

In some inventive embodiments, an inventive granule is formed from at least one soluble fertilizer-rich domain fused to at least one humic-rich domain. It is appreciated that the at least one humic-rich domain may be essentially potassium humate. It is further appreciated that the at least one soluble fertilizer-rich domain may be essentially urea. In a specific inventive embodiment, the at least one soluble fertilizer-rich domain is a urea core having a surface area. The at least one humic-rich domain forms a coating from 0.1 to 10 total weight percent, thereby forming an inventive granule. It is appreciated that upon being rotary tumbled the inventive granules have a urea domain core surface area with greater than 90% surface area coverage by the humic-rich domain and in some embodiments greater than 95% and even 99% surface areas coverage. This thickness of the coating is typically uniform within 20% of the coating thickness, t. In other inventive embodiments, the at least one humic-rich domain does not form only a surface coating around the at least one soluble fertilizer-rich domain, and may also be admixed into an inventive granule.

In some inventive embodiments, the granule is overcoated with anti-dusting agent. Anti-dusting agents operative herein illustratively include mineral oil, guar gum, and sugar. It is appreciated that a sugar melt is readily used to enrobe an inventive granule. While mineral oil or guar are typically applied as a solubilized or neat spray.

The granules of the present invention have a mean t domain size that ranges from 0.1 mm to 10 mm. In specific embodiments, the mean t domain size ranges from 0.3 mm to 8 mm while in still other embodiments the mean t domain size ranges from 0.5 mm to 5 mm. The homogeneous combined urea and humate granules, in one embodiment, and the humic-rich coated granules with urea core, in another embodiment, are typically spherical owing to formation in a tumble, but other shapes such as cylindrical, ovoidal, polyhedronal, and irregular non-polyhedronal are operative herein. When non-spherical shapes are used, the domain size refers to the longest linear dimension of the granule. With reference to an inventive granule having a urea core and a humic-rich coating, it is appreciated that the smaller the urea core the higher the surface area and therefore the amount of humics that can be coated thereon increases. By way of example, a 2.2 mm spherical urea core can accept a coating of about 4 total weight percent before the humics coating becomes friable. In specific inventive embodiments, no binder is present between the humics and soluble fertilizer in the inventive granule; while in other embodiments, micronutrients, biostimulants, other N-P-K contributing salts, or a combination thereof are formed into fine granule particulate additives that are admixed with the humics, the fine granules being sized such that greater than 90 weight percent of the granules are between +400 and −40 standard mesh size (US Sieve). Soil micronutrients operative herein illustratively include calcium, magnesium, sulfur, iron, manganese, copper, zinc; oxides thereof, salts thereof and combinations thereof. Biostimulants are substances that promote plant survival and health and illustratively include plant growth hormones and plant growth regulators such as cytokinins, auxins, gibberellins, ethylene, absisic acid and a combination thereof. Additives operative herein illustratively including fillers, desiccants, colorants, fragrances, and combinations thereof. Such additives, if present make up between 0.01 and 20 total weight percent of the inventive granule. In a specific inventive embodiment such additives, if present are only present in the humic-rich coating of an inventive granule.

An inventive granule promotes the growth of targeted desirable organisms illustratively including cultivated plants such as lawn grass, crops, flowers, shrubs, trees and bushes.

The soluble fertilizer ingredient is present in amounts ranging from 90% to 99.9% by weight of the total dry weight of the granule and for example for a 2.2 mm urea granule with 2% humics represents a 44-0-0 NPK value material.

Figure 1:
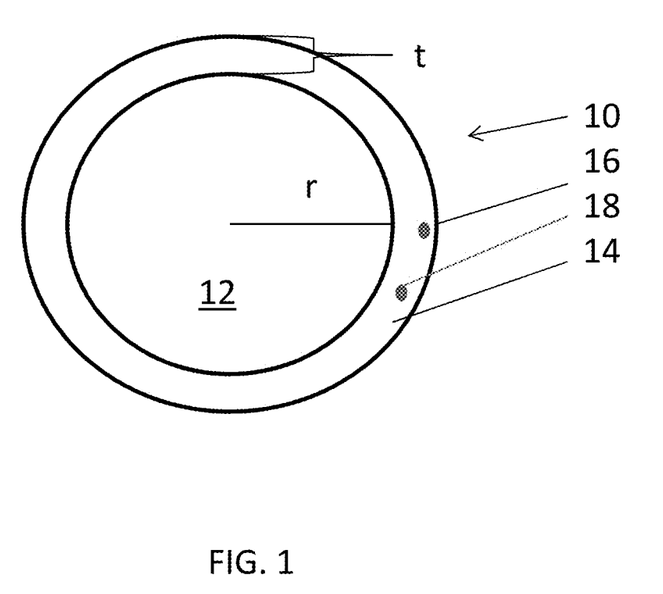
FIG. 1 is a cross sectional view of an inventive particle with a humics coating, of radius r, and a surface coating, an optional adhesive layer is also depicted.

Referring now to the figures, FIG. 1 shows an inventive granule generally at 10. The granule 10 has a urea core 12 with humics adhered thereto as a coating 14. A fine granule particulate additive 16 of micronutrients, biostimulants, N-P-K contributing salts, or a combination thereof is present in the core 12 as fine granules or a solute in the coating 14, or a combination thereof. Additives 18 are present in some embodiments in the core 12 as fine granules or a solute in the coating 14, or a combination thereof. The urea core 12 has a domain size and a surface defined by radius r; although it is appreciated that oblong pellets are also envisioned with the scope of the present invention. The coating 14 having a thickness, t and shown in partial cutaway. In certain embodiments, the linear ratio r:t is between 1:0.01-0.1. It is appreciated that the thickness, t is exaggerated in FIG. 1 for visual clarity.

Figure 2A:
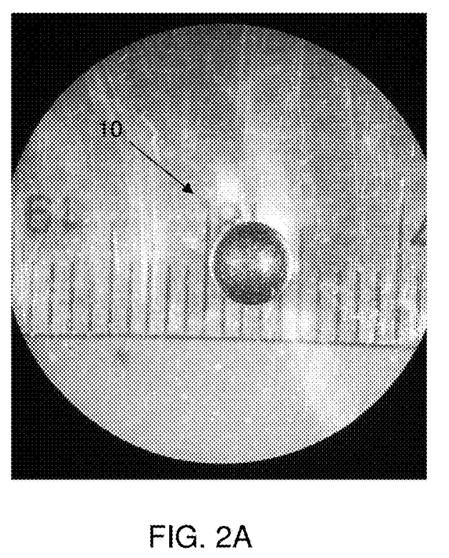
FIGS. 2A and 2B are photographs of an inventive melt derived homogenous potassium humate/urea granule, and the granule split, respectively.
Figure 2B:
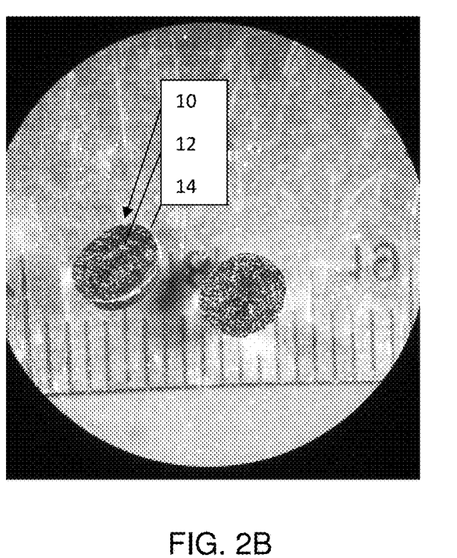

FIGS. 2A and 2B are photographs of an inventive homogenous potassium humate/urea granule shown generally at 10, and the granule 10 split, respectively. The granule 10 has a homogeneous mixture of urea 12 and humics 14. Micronutrients, biostimulants, N-P-K contributing salts, or a combination thereof may be present in the mixture as fine granule particulate additives or as a solute, or a combination thereof. Additives may be present in some embodiments in the core as fine granules or a solute, or a combination thereof. The granule 10 has a domain size and a surface defined by a radius; although it is appreciated that oblong pellets are also envisioned within the scope of the present invention. In some inventive embodiments, the humic 14 is a humate and in other inventive embodiments, potassium humate.

A granule 10 is readily formed by mixing particles of urea and humics and melting the urea to include the particles of humics therein. By cooling droplets of the melt, the granule 10 is formed. Conventional techniques for cooling the melt to form granules 10 illustratively include spray drying, a shot tower, or a drip manifold delivering melt onto a cooling substrate.

Figure 3A:
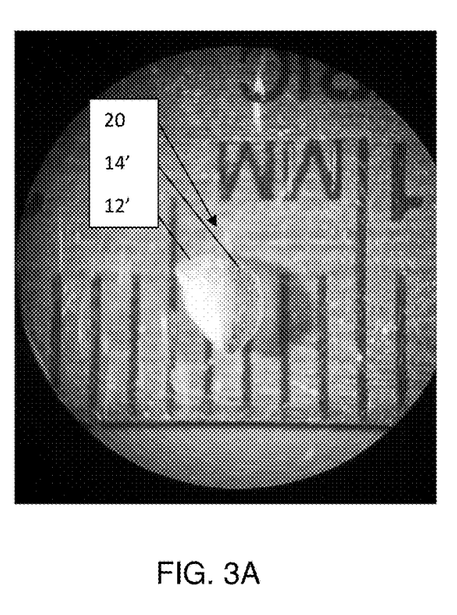
FIG. 3A is a photograph of an inventive separate melt derived hemispherical potassium humate/urea granule, and the granule split.
Figure 3B:
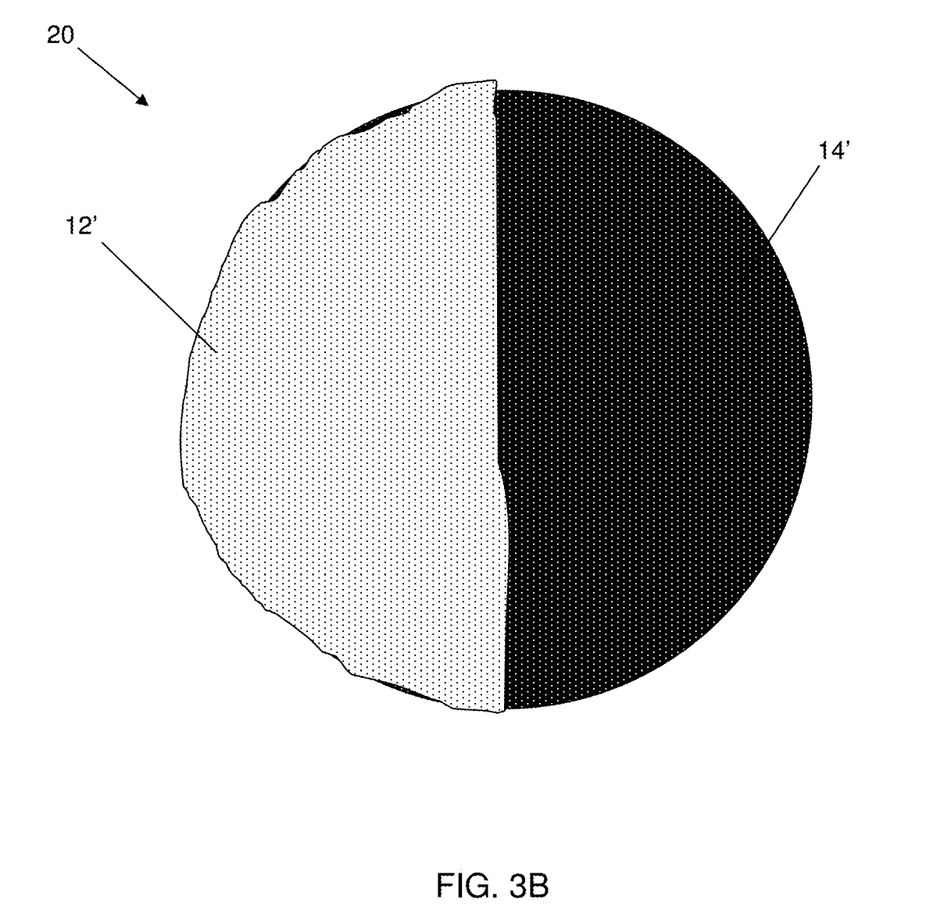
FIG. 3B is a schematic of the granule shown in FIG. 3A.

FIGS. 3A and 3B show an inventive granule 20 formed from two compositionally separate portions that as shown are hemispheres, where a first domain is humics-rich 14' and formed from a melt and a second domain that is urea-rich 12' and formed from a melt. The separate domains 12' and 14' are readily formed as drops on a nonstick sheet or surface prior to joining. It is appreciated that the domains 12' and 14' can be mutually exclusive of urea and humics, respectively; or have a minority by weight of a domain being the other component relative to the component in which a portion is enriched. While this embodiment is shown with two hemispherical portions, it is appreciated that 3, 4, 5, 6, or even more globules of molten material can be joined to form an inventive granule. It is further appreciated that the humic-rich domain 14' and the urea-rich domain 12' may have a planar interface therebetween. In some inventive embodiments, the humics 14' is a humate and in other inventive embodiments, potassium humate.

Figure 4:
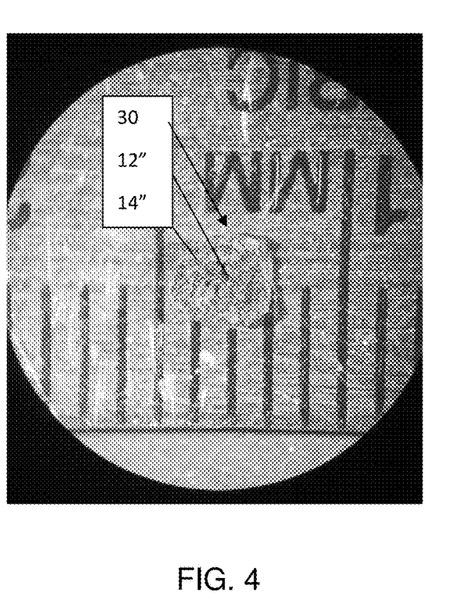
FIG. 4 illustrates a cross sectional photograph of an inventive potassium humate/urea granule formed by moistening a particulate mixture with minimal water through pan agglomeration.

FIG. 4 shows an inventive granule 30 formed by combining particulate of humics 14" and urea 12". The particles 12" and 14" are tackified. As the particles 12" and 14" are rolled together on a pan agglomerator, an inventive granule 30 forms. A typical granule 30 contains from 50 to 10,000 particles 12" and 14".

An inventive process for making inventive granules includes starting with urea domains that are the desired size and shape. The urea domains are mixed with humics and any fine particles of additives that are desired to be incorporated within an inventive granule. In order to promote adhesion of the humics absent a binder, the mixture is subjected to a process that temporarily tackifies the urea domain surface. Tackifying techniques illustratively include microwave heating, convection heating, and conduction heating. To further promote adhesion, pressure is applied to the mixture, steam, a small quantity of water, alcohol, or a combination thereof are added. Without intending to be bound to a particularly theory, with a finite addition of water, steam, or alcohol to only partially hydrate the contacting particles surfaces that upon recrystallization are joined. Pressure is believed to operate by melding the friable humics into the softened urea surface. In those instances when water, steam, or alcohol is added, the resulting granules are dried to assure that the granules are free-flowing. It is appreciated that the heat and secondary treatments of pressure, steam or water are conducted sequentially in either order, or simultaneously. The resulting inventive domains are overcoated with an anti-dusting agent by conventional methods.

The granules of the present invention have minimal dust as measured by smoke meter opacity compared to conventional forms of soluble fertilizer with humics, even without an anti-dusting agent overcoating.

The granules of the present invention are administered to a target plant species to produce a desired effect directly on the plant, to promote the health of the soil biome in which the plant is growing, or to inhibit an undesirable organism in proximity to the target plant. Granules are administered by a method that delivers the granules to the vicinity of the plant.

Inventive granules are readily mixed and added to the spray tank using industry standard practices including: pouring into the strainer basket at the top tank opening and running water over the granules to solubilize, preparing a bucket slurry mixture, adding granules through the spray tank inductor system, or preparing a solution in a mix batch tank system. The time required to solubilize inventive granules is reduced by using warm or hot water. Inventive granules are compatible with the most widely used control products for finely maintained cool and warm season turf. The inventive granules completely solubilize when added to water and typical application spray rates range from 0.10-1.00 nitrogen/1000 ft$^2$.

The inventive granulates as a clean, dry, dust-free, spherical material is also well-suited dry spread application and can be applied through all types of granular spreading equipment including THE ANDERSONS® Professional rotary spreaders, and larger scale broadcast spreaders such as Lely and Vicon models. Typical application rates range from 0.75 to 1.50 lbs nitrogen/1000 ft$^2$.

The present invention is further detailed with respect to the following non-limiting examples.

Example 1

A granule having the form depicted in FIG. 1 is formed by fusion of potassium humate to a urea core. The resulting granules have an N-P-K of 44-0-0 (urea core alone) with 12 percent by weight of potassium humate. A number average granule diameter is 4.5 millimeters. Clean, spherical, free flowing granules are 100% soluble for use in both aqueous liquid and dry applications.

Example 2

Figure 5:
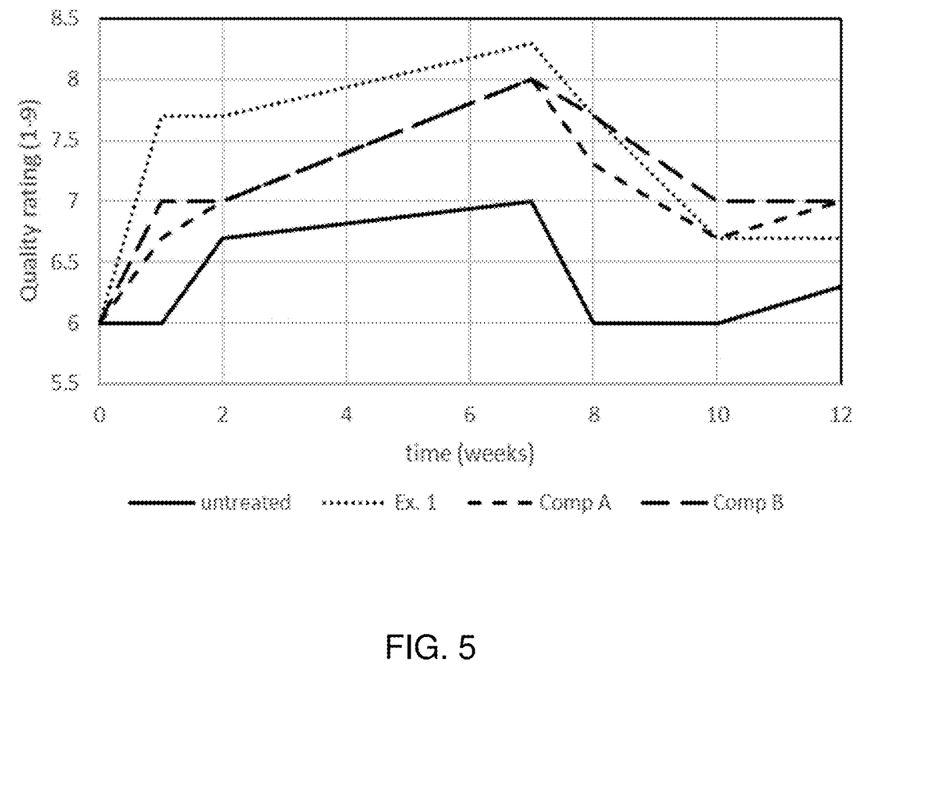
FIG. 5 is a plot of Bermuda grass quality for an inventive humate coated urea granule relative to comparative competitive products as a function of time.

A study was conducted applying the granulates of Example 1 to a randomized grid of Bermuda grass plots at a rate of 1.00 lb Nitrogen/1000 ft$^2$. Other plots were untreated as a control. For comparison, two commercial materials were tested, Comparative A being 46-0-0 stabilized nitrogen fertilizer specially formulated for the professional lawn care and landscape markets that is coated with a non-humic coating that protects against all three forms of loss—leaching, denitrification and volatilization; Comparative B being a wholly soluble, 46-0-0, urea-based stabilized nitrogen (N) fertilizer that is coated with a non-humics coating that protects against all three forms of nitrogen (N) loss—leaching, denitrification and volatilization and containing both urease and nitrification inhibitors. Comparatives A and B also applied at a rate of 1.00 lb Nitrogen/1000 ft$^2$. The grass was assessed based on a 1-9 scale with 9 being the best. The results are shown in FIG. 5 indicating comparable results between the granules of Example 1 and Comparatives A and B; all being superior to the negative control of untreated.

Any patents or publications mentioned in this specification are indicative of the level of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

The invention claimed is:

1. A granule defined by a shape and a size comprising:
a soluble fertilizer particle; and
a plurality of from 50 to 10,000 humic particles adhered to said soluble fertilizer particle with a finite quantity of water to only partially hydrate a surface of said soluble fertilizer particle and a surface of each of said plurality of humic particles that upon agglomeration are joined without a binder or an antidusting agent overcoat.

2. The granule of claim 1 wherein the shape is spherical, cylindrical, ovoidal, polyhedronal, or irregular non-polyhedronal.

3. The granule of claim 1 wherein the mean domain size is between 0.1 and 10 mm.

4. The granule of claim 1 wherein said plurality of humic particles are potassium humate.

5. The granule of claim 1 wherein said plurality of humic particles are either fused to said plurality of soluble fertilizer particles or are joined by recrystallized surfaces to said plurality of soluble fertilizer particles.

6. The granule of claim 1 further comprising at least one of an additive or a particulate additive, said particulate additive being at least one of a micronutrient, bio stimulant, or a soluble N-P-K contributing salt.

7. A process of forming a granule of claim 1 comprising:
forming a mixture of particles of soluble fertilizer and humics, said particles each having a particle surface;
tackifying the soluble fertilizer particle surface in contact with said particles of humics to create adherence between the soluble fertilizer particle surface and said particles of humics to form the granule without resort to a binder or an antidusting agent overcoat.

8. The process of claim 7 wherein said tackifying is melting of the soluble fertilizer particle surface.

9. The process of claim 7 wherein said tackifying is solvating the soluble fertilizer particle surface with water, steam, alcohol, or a combination thereof to form a mass of solvated particles of humics and pan agglomerating the mass.

10. A granule defined by a shape and a size comprising:
at least one soluble fertilizer-rich domain; and
50 to 10,000 humic-rich domains adhered to said at least one soluble fertilizer-rich domain with a finite quantity of water to only partially hydrate a surface of said at least one soluble fertilizer-rich domain and a surface of said humic-rich domains that upon agglomeration are joined without a binder or an antidusting agent overcoat.

11. The granule of claim 10 wherein said humic-rich domain forms a surface coating around said at least one soluble fertilizer-rich domain and is admixed with said at least one soluble fertilizer-rich domain.

12. The granule of claim 10 wherein the mean domain size is between 0.1 and 10 mm.

13. The granule of claim 10 further comprising at least one of an overcoating of an additive, and a particulate additive, said particulate additive being at least one of a micronutrient, biostimulant, or a soluble N-P-K contributing salt.

14. The granule of claim 10 wherein said at least one humic-rich domain consists essentially of potassium humate.

15. The granule of claim 10 wherein said at least one soluble fertilizer-rich domain consists essentially of urea.

16. The granule of claim 15 wherein said at least one soluble fertilizer-rich domain is a urea core having a surface area and said at least one humic-rich domain forms a coating covering at least 90 percent of the surface area of said urea core, said coating being adhered to said urea core through the action of at least one of water, steam, pressure, or heat resulting in said coating being nonfriable.

17. The granule of claim 16 wherein said urea core has a mean domain size of between 0.1 and 10 mm, said coating constitutes between 0.1 and 10 total weight percent to urea core, and wherein a particulate additive is only present in said coating, said particulate additive being at least one of a micronutrient, biostimulant, or a soluble N-P-K contributing salt.

18. The granule of claim 10 wherein said at least one humic-rich domain is a single humic-rich domain and said at least one soluble fertilizer-rich domain is a single soluble fertilizer-rich domain.

\* \* \* \* \*